(12) United States Patent
Harle

(10) Patent No.: US 12,057,637 B2
(45) Date of Patent: Aug. 6, 2024

(54) RADAR REFLECTOR APPARATUS FOR A MOVING OBJECT

(71) Applicant: Board of Trustees of Michigan State University, East Lansing, MI (US)

(72) Inventor: Lee Harle, Ann Arbor, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 253 days.

(21) Appl. No.: 17/480,195

(22) Filed: Sep. 21, 2021

(65) Prior Publication Data

US 2022/0094070 A1 Mar. 24, 2022

Related U.S. Application Data

(60) Provisional application No. 63/081,496, filed on Sep. 22, 2020.

(51) Int. Cl.
| | | |
|---|---|---|
| *H01Q 15/18* | (2006.01) | |
| *G01S 13/75* | (2006.01) | |
| *H01Q 1/32* | (2006.01) | |

(52) U.S. Cl.
CPC ............ *H01Q 15/18* (2013.01); *G01S 13/75* (2013.01); *H01Q 1/3233* (2013.01)

(58) Field of Classification Search
None
See application file for complete search history.

(56) References Cited

U.S. PATENT DOCUMENTS

| 10,649,117 B1 * | 5/2020 | Lewellen ............... G02B 5/122 |
| 2010/0207754 A1 | 8/2010 | Shostak et al. |

(Continued)

FOREIGN PATENT DOCUMENTS

| DE | 102019004622 A1 * | 1/2021 | |
| JP | 2008095236 A * | 4/2008 | |
| WO | WO-2015013240 A1 * | 1/2015 | ............ G01S 11/026 |

OTHER PUBLICATIONS

Harle, L., et al., "Wearable and Integratable Sensors for Automotive-Bicycle Collision Avoidance," MSU project proposal for ZF TRW (disclosed to third parties for potential funding on Jul. 14, 2017).

(Continued)

*Primary Examiner* — Peter M Bythrow
*Assistant Examiner* — Nazra Nur Waheed
(74) *Attorney, Agent, or Firm* — Harness, Dickey & Pierce, PLC

(57) ABSTRACT

A reflector apparatus is provided. A further aspect employs at least one antenna or radar operably emitting signals, and a moving object-mounted reflector which operably reflects at least some of the signals back to the at least one antenna or radar, the reflector including trihedral walls with metallic reflective surfaces. In another aspect, a programmable controller in an automotive vehicle determines a moving object-characteristic based on at least reflected signals received by a horn antenna using a Doppler or micro-Doppler effect. Still another aspect includes a trihedral reflector which moves with a movable object including handlebars, a straddled user seat and being one of: a bicycle, a motorcycle, or an all-terrain vehicle. A further aspect includes multiple spaced apart trihedral reflectors attached to a user-wearable, flexible and nonconductive substrate.

19 Claims, 6 Drawing Sheets

(56) References Cited

U.S. PATENT DOCUMENTS

2018/0000184 A1\* 1/2018 Jang .................... F21V 33/0008
2018/0164429 A1   6/2018 Tasovac et al.
2020/0082722 A1\* 3/2020 Beiski ................ G06K 7/10366
2022/0146664 A1\* 5/2022 Ichiki .................... G01S 13/867
2022/0216616 A1\* 7/2022 Kim ....................... H01Q 15/18

OTHER PUBLICATIONS

Doerry, A., "Reflectors for SAR Performance Testing," Sandia National Laboratories, (Jan. 2008).
Belgiovane, D., et al., "Bicycles and Human Riders Backscattering at 77 GHz for Automotive Radar," The ElectroScience Laboratory Dept of Electrical and Computer Engineering, The Ohio State University (published or publicly disclosed before Sep. 22, 2020).

\* cited by examiner though claims the benefit of U.S. Provisional Patent Application Ser. No. 63/081,496, filed on Sep. 22, 2020, which is incorporated by reference herein.

RADAR REFLECTOR APPARATUS FOR A MOVING OBJECT

CROSS-REFERENCE TO RELATED APPLICATIONS

The application claims the benefit of U.S. Provisional Patent Application Ser. No. 63/081,496, filed on Sep. 22, 2020, which is incorporated by reference herein.

BACKGROUND AND SUMMARY

The present application generally pertains to a reflector apparatus and more particularly to a radar reflector apparatus for a moving object.

Experiments have attempted to use 76-78 GHz automotive radar for sensing bicycles and pedestrians. At these common frequencies, however, the bicycle and rider targets undesirably appear overly large as a function of wavelength (at approximately 3.9 mm) which is problematic. The abstract of D. Belgiovane and C. Chen, "Bicycles and human riders backscattering at 77 GHz for Automotive Radar," 2016 10$^{th}$ European Conference on Antennas and Propagation (EuCAP) (10-15 Apr. 2016) notes that "using cost effective vehicular radars in reliably detecting pedestrian and bicyclist with low false alarm rate still poses challenging [sic] due to many possible variations of these targets as well as the presence of other road objects."

It is also known to emboss a dihedral corner reflector on a vehicle for reflection of a radar or laser-radar transmitter from a following vehicle. This configuration is discussed in U.S. Patent Publication No. 2010/0207754 entitled "Vehicular RFID and Sensor Assemblies" which published on Aug. 19, 2010 to Shostak et al., and is incorporated by reference herein. Paragraph [0997] of this Shostak patent publication, however, opines that "trihedral corner reflectors cannot stand out over the background of the [terrain] clutter."

In accordance with the present invention, a reflector apparatus is provided. A further aspect employs at least one antenna or radar operably emitting signals, and a moving object-mounted reflector which operably reflects at least some of the signals back to the at least one antenna or radar, the reflector including trihedral walls with metallic reflective surfaces. In another aspect, a programmable controller in an automotive vehicle determines a moving object-characteristic based on at least reflected signals received by a horn antenna using a Doppler or micro-Doppler effect. Still another aspect includes a trihedral reflector which moves with a movable object including handlebars, a straddled user seat and being one of: a bicycle, a motorcycle, or an all-terrain vehicle. In yet an additional aspect, multiple radar reflectors are mounted to a flexible substrate, such as a closed loop strap, the substrate and reflectors being moveable with a movable object, and an antenna sending radar signals and receiving reflected radar signals, is attached to an automotive vehicle. A further aspect includes multiple spaced apart trihedral reflectors attached to a user-wearable, flexible and nonconductive substrate. Methods of making and using a reflector are also provided.

The present sensor is advantageous over conventional devices. For example, the present reflector apparatus is low cost, flexible and lightweight. Moreover, the present reflector apparatus beneficially provides a well-defined, more easily sensed and more accurately measured object target for surrounding vehicles. The present reflector apparatus is ideally suited for use to detect moving, single-user wheeled vehicles such as bicycles, motorcycles, ATVs, baby strollers, and skateboards, as well as moving pedestrians, which may otherwise be difficult to accurately sense relative to the background environmental clutter. The trihedral reflector structure and/or spaced apart arrangement of Doppler reflectors on a flexible substrate are believed to provide a superior reflective signal for Doppler antenna detection as compared to previous attempted configurations. Additional advantageous and features of the present system and method will become apparent from the following description and appended claims, taken in conjunction with the accompanying drawings.

DETAILED DESCRIPTION

Figure 1:
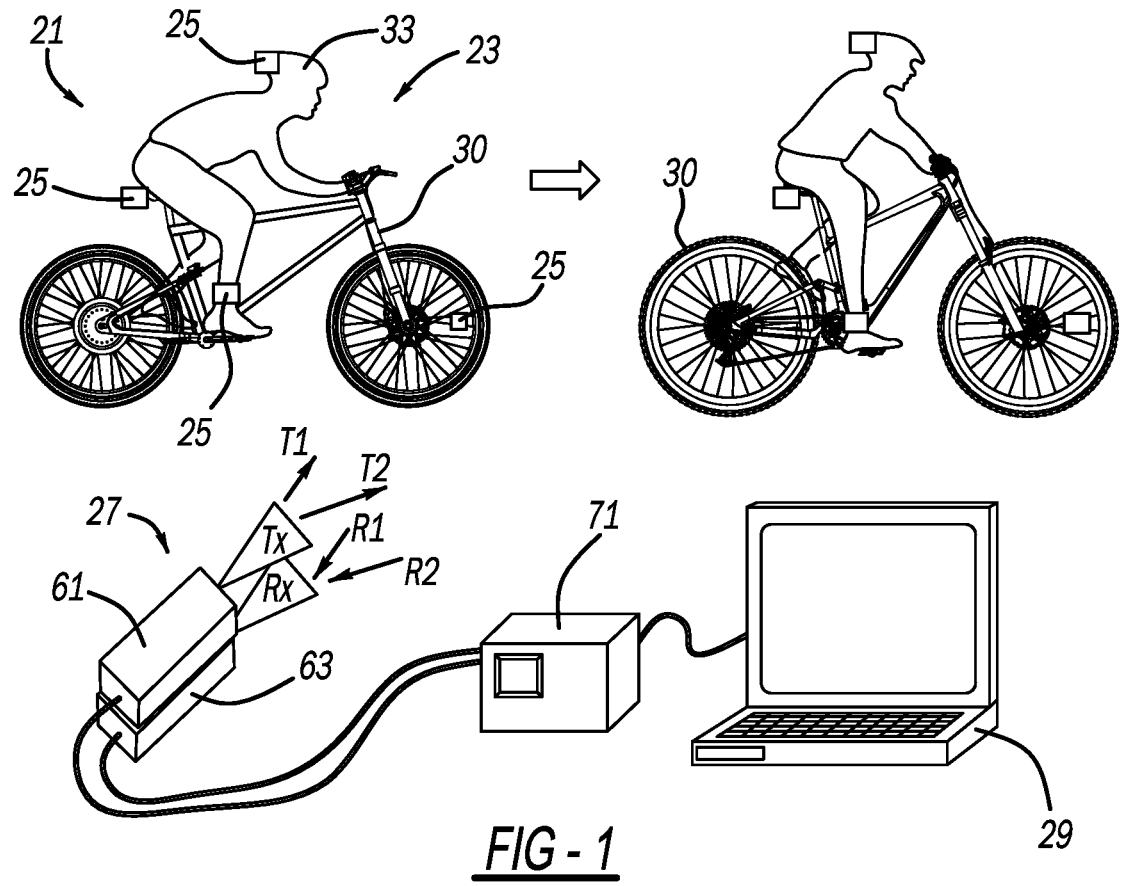
FIG. 1 is a diagrammatic view showing the present reflector apparatus with a reflector portion employed with a moving bicycle vehicle.
Figure 2:
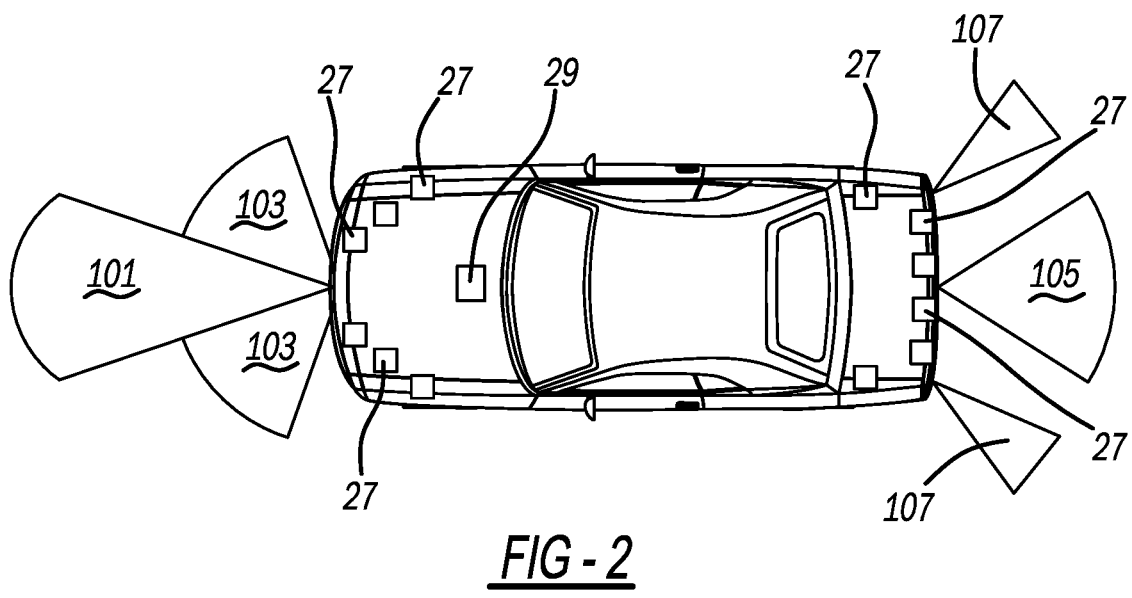
FIG. 2 is a top diagrammatic view showing the present reflector apparatus with antenna and controller portions employed on an automotive vehicle.
Figure 3:
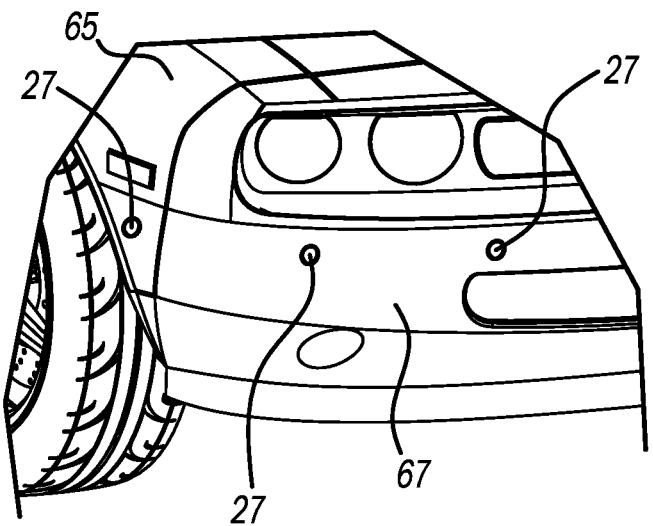
FIG. 3 is a front fragmentary, perspective view showing the antenna portions of the present reflector apparatus employed on the automotive vehicle.
Figure 4:
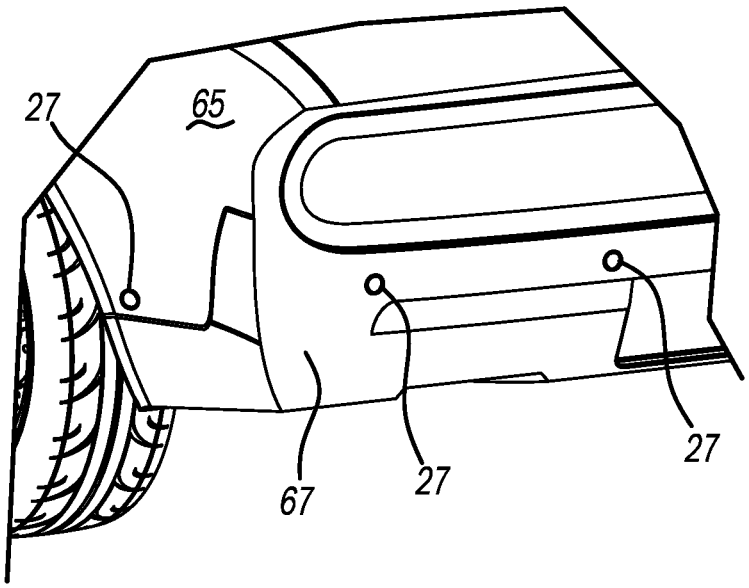
FIG. 4 is a rear fragmentary, perspective view showing the antenna portions of the present reflector apparatus employed on the automotive vehicle.

A preferred embodiment of a reflector apparatus 21 is shown in FIGS. 1-8. Reflector apparatus 21 includes a moving target object 23, a reflector assembly 25, antenna assemblies 27, and a programmable controller 29. In one embodiment, moving target object 23 is a single-user wheeled vehicle such as a bicycle 30, motorcycle, all-terrain vehicle ("ATV"), baby stroller or carriage, skateboard, or the like. For example, reflector assembly 25 is attached to bicycle 30 via a bracket screwed or clamped onto a seat post, frame, wheel and/or handlebars.

In another embodiment, moving target object 23 is a human or animal such as a dog or cat, to which reflector assembly 25 is attached, such as to a removable strap 31, helmet 33, clothing or collar; the human may be a walking or running pedestrian, or a rider of single-user vehicle. More specifically, reflector assembly 25 includes multiple trihedral reflectors 41 which each have three reflective walls 43 which are offset angled from each other at right angles. Walls 43 are made from or coated with an electrically conductive metal such as copper or an alloy thereof. Alternately, walls 43 may be carbon or glass fiber with a copper-based sputter-coating. Alternately, an antioxidizing layer can be applied to exposed and reflective surfaces of walls 43. Each wall 43 preferably has an exemplary flat surface area of 12-20 mm² and of a square, triangular or curved periphery. A curved peripheral distal edge advantageously minimizes undesired catching of the reflector against an adjacent surface such as a bicycle chain, clothing or the like.

Figure 7:
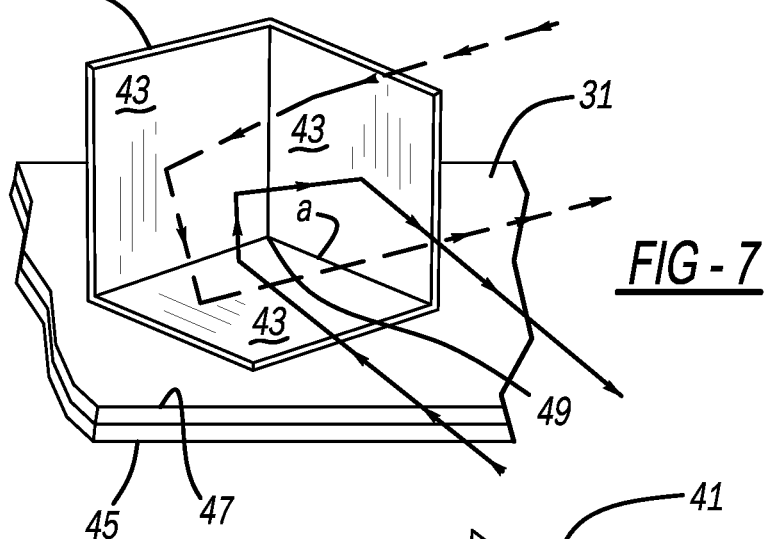
FIG. 7 is a fragmentary perspective view showing the present reflector apparatus.

More specifically, each trihedral reflector 41 has three orthogonal plates or walls 43 joined together such that they intersect at a single point. They are referred to as retroreflectors because they return the incident radar wave to the source. The plates often take the shape of right triangles, squares, or quarter-disk plates. As illustrated in FIG. 7, a line of intersection between any two of the adjacent plates is defined as 'a', and the radar return from the trihedral or radar cross-section is proportional to $a^4$ and inversely proportional to the radar free space wavelength²:

$$RCS \propto \frac{a^4}{\lambda^2}.$$

The highest return is at a bore-site or along the symmetry axis, and is reduced with an angle in both azimuth and elevation. Reflections occupy a −3 dB cone about bore-site of between 23 to 40 degrees, depending on the plate shape as is discussed in greater detail in the publication: George Ruck, et al., "Radar Cross Section Handbook," vol. 2 (2002). Therefore, the size of each trihedral reflector is a function of the frequency and wavelength. The arrows in FIG. 7 show a triple bounce reflection caused by the trihedral shape of the reflector.

Reflectors 41 are attached to strap 31 which is a flexible and nonconductive substrate material 45, such as fabric or a mesh polymer. An optically reflective layer 47, such as a film or paint, may optionally be applied on an exterior surface of substrate material 45, between the reflectors. Reflectors 41 are linearly spaced apart from each other in a longitudinal direction which coincides with a direction of elongation of strap 31; this can best be observed in FIGS. 5 and 6. One exemplary and non-limiting configuration is with each reflector 41 embedded into substrate material 45 with its apex corner 49 below a nominal outer surface 51 thereof.

Figure 5:
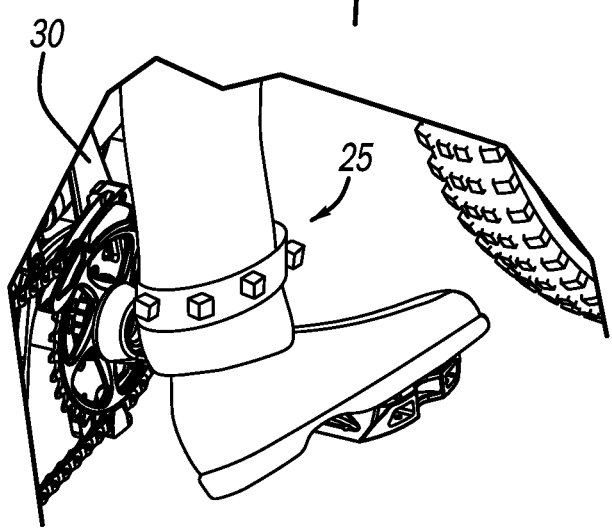
FIG. 5 is a fragmentary and enlarged perspective view showing the reflector portion of the present reflector apparatus.
Figure 6:
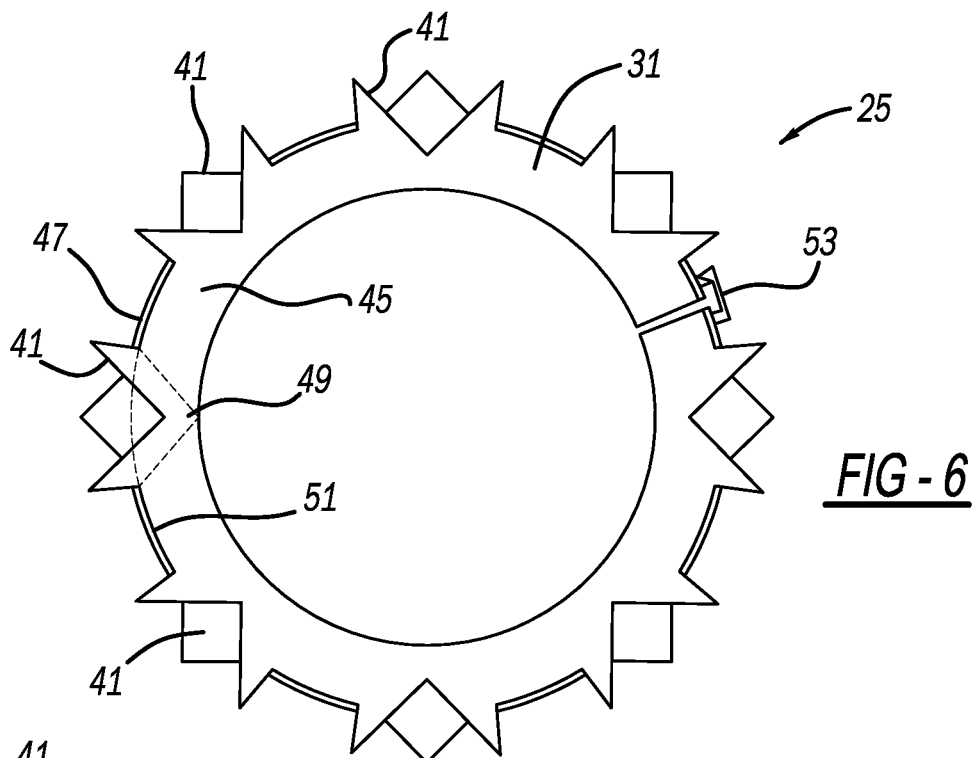
FIG. 6 is a diagrammatic, cross-sectional view showing the present reflector apparatus.

For the ankle strap embodiment illustrated in FIGS. 5 and 6, substrate layer 45 of strap 31 is curved in a generally circular shape with a releasable fastener 53 coupling together ends thereof when in a use condition. In this example, the reflector-to-strap arrangement causes apex 49 or focal point of each reflector to outwardly point in different radiating directions to maximize reflective directions especially when the target object and/or approaching vehicle are moving and turning relative to each other.

In a low volume situation, by way of non-limiting example, the substrate layer is three-dimensionally printed from a polymer, and the reflectors are either three-dimensionally printed integrally onto the substrate from a metallic ink or are created by pre-made copper tape applied to the trihedral shaped substrate surfaces. In a greater volume situation, for example, the substrate layer is woven if fabric or molded if polymeric, with the reflectors being stamped sheet metal. The reflectors are then adhesively bonded to the substrate, such as by pressure sensitive adhesive tape or heated glue, as examples.

Antenna assembly 27 and controller 29 of the present reflector apparatus 21, and the overall system functionality, will now be discussed in greater detail with reference to FIGS. 1-4 and 9-13. Each antenna assembly 27 includes an exemplary transmitting and bistatic horn antenna 61 and a receiving and bistatic horn antenna 63 mounted adjacent to each other at multiple spaced points of an approaching vehicle 65, such as along front and rear facias 67, grille or bumpers. Bistatic horn antennae are well suited for use with the present trihedral reflectors since the trihedral shape will minimize misdirection or distortion of the polarized transmitted and reflected signals $T_x$ and $R_x$, respectively, of the antennae. Each antenna 61 and 63 is electrically connected to a vector network analyzer 71 in a laboratory or static version, or a transceiver 73 in the approaching vehicle version. An exemplary configuration for controller 29 includes a programmable microprocessor 75 with an input timer 77, acquisition random access memory 79, a serial peripheral interface 81, an analog-to-digital converter 83 and a fast Fourier transform engine 84, on a printed circuit board. A power supply 85 connects the microprocessor to a 12 volt battery power supply or the like. A low noise supply and LPF+LNA components 87 and 89, respectively, are connected and an optional DAC/PLL component 91 is employed. Bus drivers 93 for the transceivers are also connected in the circuit. It should be appreciated, however, that alternate controller and circuit constructions may be used with the present apparatus.

Approaching vehicle 65 transmits radar signals in a primarily forward and longer range 101, a primarily outwardly fanning and shorter forward cross traffic alert range 103, a rearwardly directed collision warning and reverse range 105, and rear corner blind spot detection ranges 107. The preferred frequency of the transmitted radar signals in the W-band spectrum is 77-81 GHz with a 79 GHz central frequency as a frequency modulated continuous wave ("FMCW"). These transmitted radar signals within ranges 101-107 are reflected back by trihedral reflectors of assembly 25 to the aligned receiving antennae 63. These reflected and received radar signals are then analyzed by the software instructions run by controller 29 as set forth in FIG. 11. The controller and instructions compare the reflected and received signals and compare them to object signatures pre-stored in a database or table in the memory. A determination is then automatically made by the microprocessor to identify the target object (e.g., bicycle, motorcycle, skateboard, human, animal, etc.), and determine the speed and direction of movement of the target object. The outcome of this determination is used by the controller to automatically vary or maintain the existing operations of autonomous driving systems such as braking, steering, throttle and the like.

Figure 12:
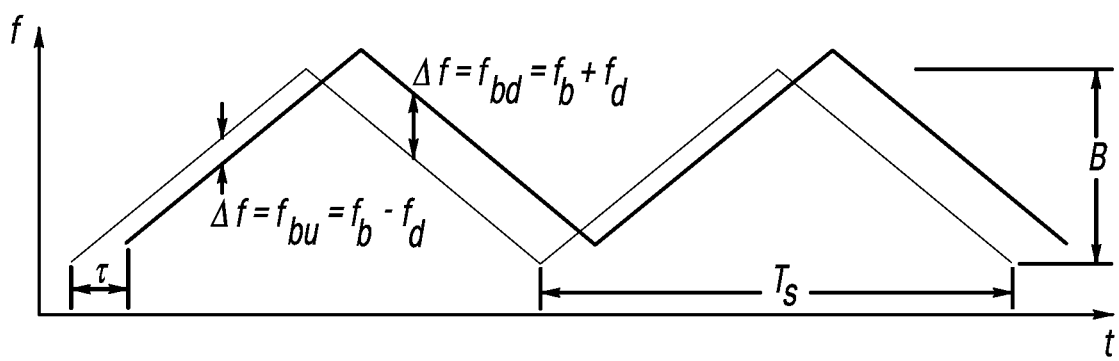
FIG. 12 is a graph showing a waveform of the present reflector apparatus.

FIG. 12 illustrates an expected velocity and range of a moving target that is computed by the controller using the signal data collected by the FMCW radar reflected by a single trihedral reflector of the present apparatus. This graph shows an expected FMCW waveform with triangular chirp modulation for sensing the moving target object. Doppler frequency shift $$f_D = f_{Rx} - f_{Tx} \sim 2\frac{v_r}{\lambda_o}$$

where $f_{Rx}$ and $f_{Tx}$ are the received and transmitted frequencies, $\lambda_o$ is the free-space wavelength and $v_r$ is the velocity of the target relative to the radar. The up-ramp and down-ramp beat frequencies are given by $f_{bu}=f_b-f_d$ and $f_{bd}=f_b+f_d$. Furthermore, the range to target is given by $$R = \frac{cT_s}{4B}(f_{bd} + f_{bu}),$$

where $T_s$ is the sweep time or chirp period, and B is the total frequency sweep or chirp; and the target velocity is given by $$v_r = \frac{\lambda_o}{4}(f_{bd} - f_{bu}).$$

Micro-Doppler signal processing by the present controller and software instructions will use discrete short-time Fourier transform ("STFT"). The Discrete-time STFT is performed by windowing the long-time digitized signal to produce short time segments, usually overlapped, and then performing the FT on each time segment. The STFT is given by: $STFT\{x(n)\}(m,\omega) \equiv X(m,\omega) = \sum_{-\infty}^{\infty} x(n)w(n-m)e^{-j\omega n}$, where w(n) is the window function centered on m, x(n) is the signal to be transformed, and $\omega=2\pi f$ where f=frequency. The magnitude squared of the STFT yields the spectrogram of the power spectral density.

Figure 13:
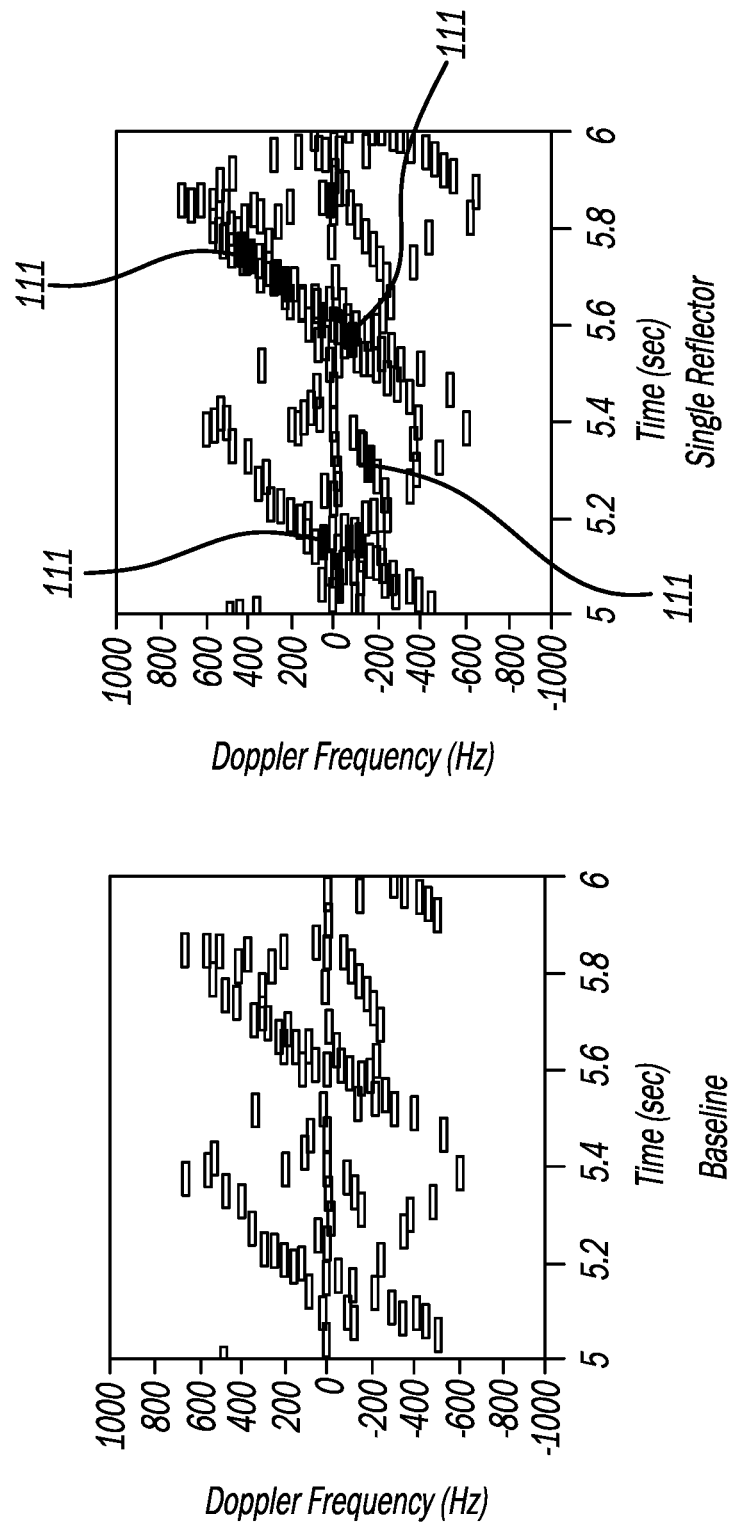
FIG. 13 is a baseline graph and a single reflector of the present reflector apparatus graph, showing expected detected signal magnitudes.

The graphs of FIG. 13 illustrate expected micro-Doppler-processed normalized Radar Cross Section (dB) of pedaling cyclist without (left graph) and with (right graph) a single trihedral reflector of the present apparatus strapped to a user's ankle. The bicycle is facing straight on towards the radar antennas and VV-pol is at 79 GHz. The expected results demonstrate that the present trihedral reflector increases RCS of the bicycle in motion by 5-10 dB, even at 0 Hz Doppler. The trihedral returns are entirely co-pol; cross-pol terms=0. The darker and more concentrated areas 111 in the single reflector right graph are indicative of expected greater magnitude (dB) results of the reflected and detected signals in the overall Doppler frequency (Hz) versus time (seconds) results.

Figure 8:
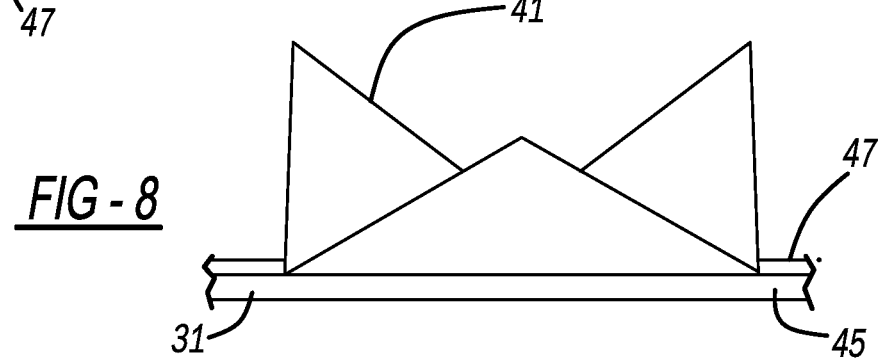
FIG. 8 is a fragmentary side view showing the present reflector apparatus.
Figure 9:
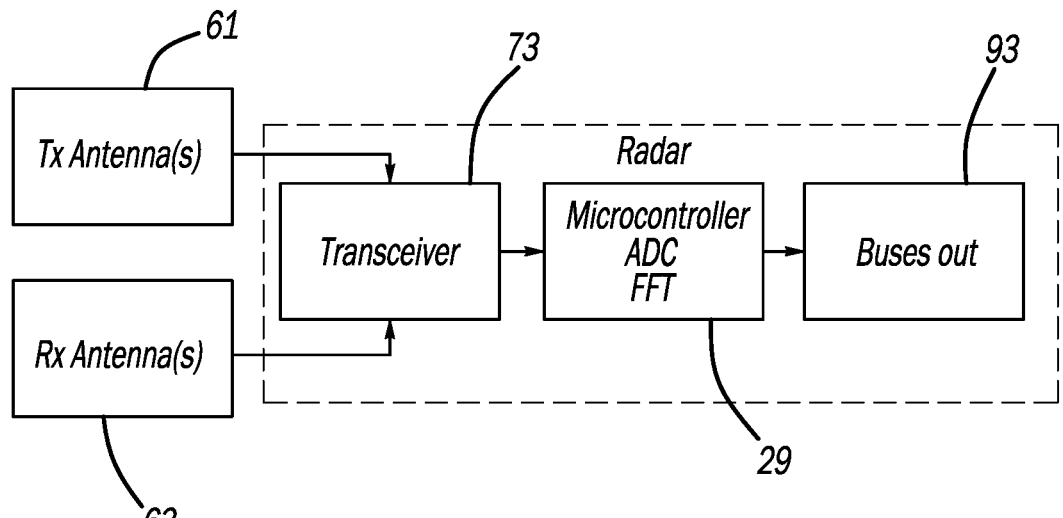
FIGS. 9 and 10 are electrical circuit diagrams of the antenna and controller portions of the present reflector apparatus.
Figure 10:
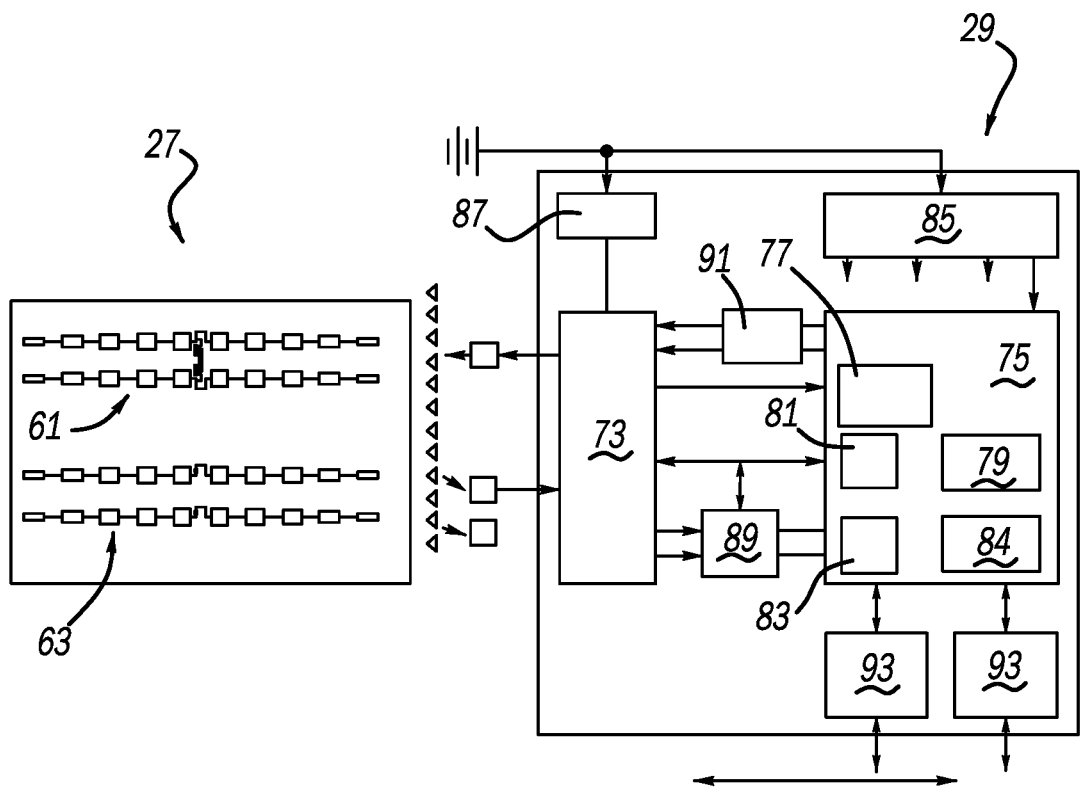
Figure 11:
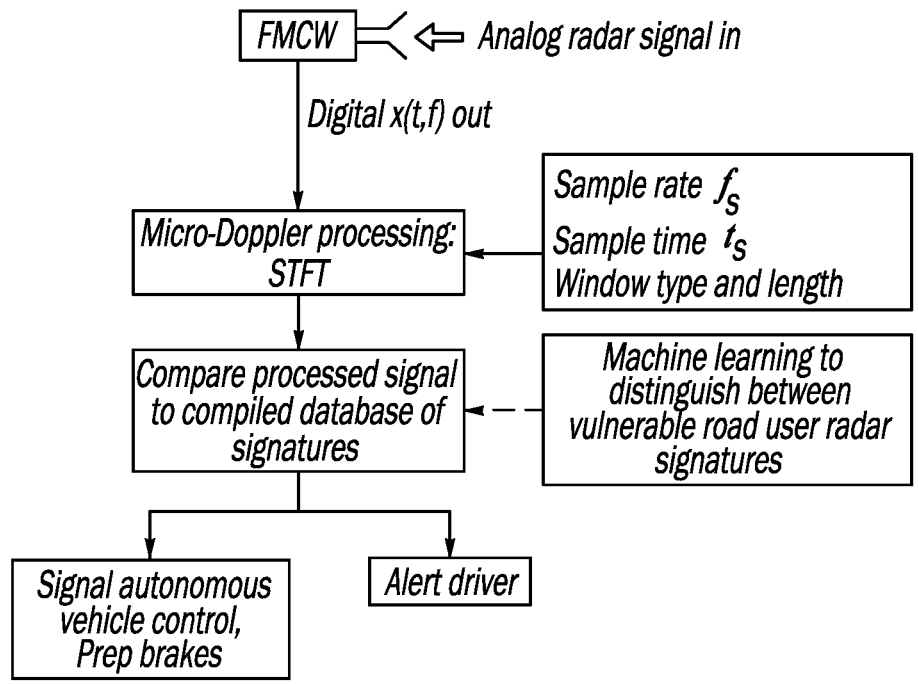
FIG. 11 is a software logic flow diagram for the controller portion of the present reflector apparatus.

For the single-user vehicle 30 embodiment of FIG. 1, reflector assembly 25 includes multiple spaced apart, trihedral reflectors like that shown in FIGS. 7 and 8, but attached to a rigid polymeric and substrate, which in turn, is mounted to the vehicle bracket. The substrate is curved in a generally semi-spherical shape to point the apex or focal point of each reflector outwardly in different directions, a cross-section of which appears like half of that shown in FIG. 6.

While various features of the present invention have been disclosed, it should be appreciated that other variations may be employed. For example, different peripheral shapes and sizes of the substrate and reflectors can be employed, although various advantages of the present system may not be realized. As another example, additional or fewer layers of the substrate and/or reflectors may be used, but certain benefits may not be obtained. Additionally, alternate electrical circuits, antennae and software instructions can be employed, although performance may suffer. Features of each of the embodiments and uses may be interchanged and replaced with similar features of other embodiments, and all of the claims may be multiply dependent on each other in any combination. Variations are not to be regarded as a departure from the present disclosure, and all such modifications are intended to be included within the scope and spirit of the present invention.

The invention claimed is:

1. A reflector apparatus comprising:
   an emitter comprising at least one: antenna or radar, operably emitting signals;
   moving object-mounted reflectors, at least one of which operably reflects at least some of the signals back to the emitter, each of the reflectors including trihedral walls with metallic reflective surfaces;
   a substrate configured for attaching to the moving object; and
   an apex corner of each of the reflectors being embedded below a nominal outer surface of the substrate;
   wherein the substrate forms an enclosed circle, the circle being open at both opposite faces thereof to allow access therethrough;
   wherein the reflectors are attached to the substrate with the reflectors being spaced apart from each other;
   wherein at least portions of each of the walls project beyond a nominal outer surface of the substrate; and
   apexes of the reflectors pointing toward a centerline axis of the circle.

2. The apparatus of claim 1, wherein the substrate is user-wearable, flexible and of a substantially nonconductive material, the substrate is elongated in a longitudinal direction, and the reflectors are attached to the substrate in a spaced apart arrangement along the longitudinal direction.

3. The apparatus of claim 1, wherein each of the reflectors include a three-dimensionally printed metallic material.

4. The apparatus of claim 1, wherein the walls of the reflectors include copper tape or stamped sheet metal.

5. The apparatus of claim 1, wherein the emitted radar signals are 77-81 GHz in the W-band spectrum, as frequency modulated continuous waves, and are reflected back by the at least one of the reflectors to the antenna.

6. The apparatus of claim 1, wherein the substrate is a human- or animal-wearable flexible strap.

7. A reflector apparatus comprising:
   multiple Doppler-reflectors configured for attachment to a moving object, each of the reflectors including only three intersecting walls with metallic reflective surfaces;
   a substrate being an enclosed circle, the circle being open at both opposite faces thereof to allow access therethrough;
   the reflectors being mounted on the substrate with the reflectors being spaced apart from each other;
   at least portions of each of the walls projecting beyond a nominal outer surface of the substrate;
   apexes of the reflectors pointing toward a centerline axis of the circle; and
   an apex of at least one of the reflectors being embedded below the nominal outer surface of the substrate.

8. The apparatus of claim 7, wherein the substrate is user-wearable, flexible and of a substantially nonconductive material, the substrate is elongated in a longitudinal direction, the reflectors are in an equally spaced apart arrangement along the longitudinal direction, and further comprising a fastener allowing opening and closing of the substrate.

9. The apparatus of claim 7, wherein the apexes of all of the reflectors are embedded below the nominal outer surface of the substrate.

10. The apparatus of claim 7, wherein each of the reflectors include a three-dimensionally printed metallic material.

11. The apparatus of claim 7, wherein the walls of the reflectors include copper tape or stamped sheet metal.

12. The apparatus of claim 7, wherein the reflectors are configured to reflecting emitted radar signals of 77-81 GHz in the W-band spectrum, as frequency modulated continuous waves.

13. The apparatus of claim 7, wherein the substrate is a human- or animal-wearable flexible strap.

14. A reflector apparatus comprising:
moving object-mounted retroreflectors, at least one of which is configured to operably reflect an incident radar signal, each of the retroreflectors including trihedral walls with reflective surfaces;
a substrate configured for attaching to the moving object; and
the substrate forming an enclosed cross-sectional shape with a hollow center area;
the retroreflectors being attached to the substrate with the retroreflectors spaced apart from each other;
at least portions of each of the trihedral walls projecting beyond a nominal outer surface of the substrate; and
apexes of the retroreflectors pointing toward the hollow center area.

15. The apparatus of claim 14, wherein the substrate is user-wearable, flexible and of a substantially nonconductive material, the substrate is elongated in a longitudinal direction, and the retroreflectors are attached to the substrate in a spaced apart arrangement along the longitudinal direction.

16. The apparatus of claim 14, wherein each of the retroreflectors include a three-dimensionally printed metallic material.

17. The apparatus of claim 14, wherein:
the walls of the retroreflectors include copper tape or stamped sheet metal; and
an apex corner of each of the retroreflectors is embedded below a nominal outer surface of the substrate.

18. The apparatus of claim 14, wherein the radar signal is 77-81 GHZ in the W-band spectrum, as frequency modulated continuous waves, and is reflected back by the at least one of the retroreflectors to an antenna.

19. The apparatus of claim 14, wherein the substrate is a human- or animal-wearable, flexible strap including a fastener.

* * * * *